UNITED STATES PATENT OFFICE.

KARL GUSTAF WENNERSTRÖM, OF BARTANGE, SWEDEN.

PROCESS FOR PRODUCING CEMENT OF LIQUID SLAGS IN ELECTRIC FURNACES.

1,343,948. Specification of Letters Patent. Patented June 22, 1920.

No Drawing. Application filed March 29, 1920. Serial No. 369,813.

*To all whom it may concern:*

Be it known that I, KARL GUSTAF WENNERSTRÖM, engineer, a subject of the King of Sweden, and resident of Bartange, Sweden, have invented certain new and useful Improvements in Processes for Producing Cement of Liquid Slags in Electric Furnaces, of which the following is a specification.

This invention relates to a process for producing cement from liquid slags in electric furnaces.

Several different processes have been proposed for the production of cement from slags. Most of them aim at heating mixtures of slags and lime or limestone for obtaining cement in different types of furnaces. It has also been proposed to add lime to liquid slags in order to obtain a mixture to be further treated in an electric furnace for melting or electrolyzing the mass, while in certain cases lime or chalk also is additionally added in the electric furnace to make a part of the mass.

According to another process proposed, liquid slag is permitted previously to flow down through a shaft which has before been charged with lime and coal and in which the lime is heated to a high temperature by burning coal or a suitable gas. This process aims at the solution of the lime by the slag and its combination with the slag to form a liquid cement. The latter process has however never been practised on acount of the fact that it is difficult to carry out and is objectionable. If for example a mixture of slag and lime is heated in an electric furnace in which carbon electrodes are utilized to form the arcs calcium carbid will be produced on account of the fact that free lime will come into contact with the electrode and as a result unsatisfactory cement will be produced. Attempts have also been made to melt in electric furnaces pulverized mixtures of suitable materials by means of carbon electrodes working in the mass. These attempts have also given the same result namely, the production of carbid on account of which a useless cement has been produced.

On the other hand there is an old process of producing cement from slags and lime or limestone in which the mixture of raw materials is pulverized and after this the mixture is burnt to sinter in rotating or shaft furnaces in which coal or gases are used as fuel.

The present invention relates to a process for producing cement from liquid slags by a direct melting of the slag with lime or limestone in an electric furnace without a previous mixing of the materials.

The liquid slag charged in an electric resistance-furnace, which slag conducts the electric current, is added from the surface of the melting bath with the lime or limestone in pieces; and while supplying electric current to the slag, the lime is thus permitted to melt down from the surface of the bath and to combine with the slag to form the cement. The temperature is here so high that it is sufficient for the reaction and sufficient to maintain the cement in a liquid state. In certain cases when there is to be had a slag with a high percentage of lime for instance slag obtained from the basic Martin or Bessemer process such slag may be substituted for lime or limestone and during the melting a more acid slag may be added.

The electric furnace is essentially an ordinary resistance furnace in which the slag itself forms the resistance. If, as mentioned, a mechanical mixture of slag and lime is exposed to a high temperature in the presence of carbon in an electric furnace, the lime will combine with the carbon to form calcium carbid. By permitting the lime to melt down from the surface of the bath it cannot come into contact with the electrode at so high a temperature as to allow carbid to be produced, when the electrode works in the mass or bath in which no free lime exists, on the contrary, silicates only will be formed, in which case the silicon should first be reduced before the lime is freed, and for which a higher temperature is necessary than the temperature necessary for melting the cement.

The object of the present invention is to avoid the objections previously mentioned, the improved process constituting the invention enabling, by reason of its simplicity, the slags to be utilized in a very economical manner in order to obtain a first class cement satisfactory in all respects. Cement produced according to this process almost completely decomposes after cooling in the air into a very fine powder, if it has not been granulated or cooled with water at the tap. When using a potassic material, or if during the melting a potassic material is added, this will escape as a gas. Slags mentioned in the description refer to lumps or balls of silicate obtained by metallurgical processes in general as well as those obtained by melting rocks or products of such materials.

Having now described my invention what I claim is:

1. The herein-described process for the production of cement from liquid slag in an electric furnace, which consists in delivering lime or limestone in broken pieces unmixed with slag upon the surface of the bath of liquid slag, and in passing an electric current through the slag bath to heat the same to an extent sufficient to melt down the lime from the surface of the slag bath and thereby cause it to combine with the slag to form the cement.

2. The herein-described process for the production of cement from liquid slag in an electric furnace having carbon electrodes arranged in the molten slag bath, which consists in delivering lime or limestone in broken pieces upon the surface of said bath, and in passing an electric current through the bath to constantly heat the same to an extent sufficient to melt down the lime from the surface of the bath and thereby cause it to combine with the slag to form the cement, while at the same time maintaining the molten lime at a temperature insufficient to cause the formation of calcium carbid due to contact of the lime with the electrodes.

Signed at Bartange, Sweden, this 27th day of February, A. D. 1920.

KARL GUSTAF WENNERSTRÖM.